3,116,223
METHOD FOR DETECTING THE PRESENCE OF GLUCOSE IN CERVICAL MUCUS
Lawrence Rosner, Chicago, and Raymond O. Foster, Joliet, Ill., assignors to Weston Laboratories, Inc., Ottawa, Ill., a corporation of Illinois
No Drawing. Filed Aug. 14, 1961, Ser. No. 131,064
2 Claims. (Cl. 195—103.5)

This application is a continuation-in-part of our earlier application, Serial No. 850,111, filed Nov. 2, 1959, now abandoned.

This invention relates to a novel method and means for the detection and estimation of glucose. More particularly it relates to a novel means for the positive detection of glucose in cervical mucus for the purpose of determining the status of the female ovulatory process.

In recent years there has been considerable progress in improving the techniques of testing for glucose in human body fluid. The older methods include the widely used conventional use of alkaline copper solutions which are heated with the materials being tested to precipitate cuprous oxide. Such older methods have had the disadvantage that their use has required a certain amount of skill and familiarity with the use of measuring equipment such as pipettes and the like, the use of liquid reagents, some of which, especially the alkaline ones, were dangerous to handle and inconvenient to transport easily. Additionally, such older methods have as characteristics in common the need for heat generally supplied by some extraneous source to carry out the tests, and also require a test tube or like container within which the testing is to take place. Many of these tests are impractically time-consuming.

Probably the greatest disadvantage attendant the older techniques is the fact that a relatively large quantity of body fluid is necessary to undertake the test. While it may be easy to obtain quantities of urine or blood for testing purposes, it is extremely difficult to obtain much from the cervical region of a female. The mucosa in this region is merely bathed in a secretion which is almost impossible to trap and even harder to test for glucose.

It is therefore a primary object of the invention to disclose a simple, rapid and convenient method for the detection and estimation of glucose without the need for extensive equipment, trained personnel and the like.

It is another object of the present invention to disclose a composition which is employed in the detection and estimation of glucose.

It is yet another object of the present invention to disclose such a composition which is used in conjunction with an absorbent material.

Another object of the present invention is to provide a composition useful for determining the presence of glucose in cervical mucus without the danger of false positive reactions.

Additional objects and advantages of the present invention will become apparent from a detailed consideration of the following description.

In recent years it has become known that there is a sharp increase in the amount of reducing substances (mainly glucose) which occurs in the mucous cascade from the cervix prior to or synchronous with ovulation. At the same time it has also been disclosed that cervical mucus normally contains several monosaccharides such as galactose, mannose, fructose and hexosamine. Medical data has established that this sharp increase in the amount of glucose in cervical mucus reliably coincides with the availability of the ovum for fertilization, and that a determination of the glucose peak can be used to predict the period of greatest fertility of the female. Prior to the present invention, however, it has been recognized by the medical profession that methods and means for analyzing for the presence of glucose in cervical mucus are not completely reliable and are known to register sporadic irregular positives.

While we do not wish to be bound by any theories at this time, the evidence that cervical mucus contains monosaccharides other than glucose, e.g., galactose, mannose, fructose and hexosamine, indicates that the sporadic irregular positives can be traced to the presence of other reducing substances such as impurities in the test reagents, or the presence of these known reducing sugars other than glucose in the cervical mucus, coupled with the presence of enzymes capable of oxidizing said other reducing sugars.

Accordingly, in the practice of this invention, we employ an indicator composition which includes two enzymes, a substance whose color is affected by hydrogen peroxide in the presence of one of these enzymes, and, if desired in addition to the foregoing, a buffer to keep the pH of the reactants at the site of reaction within a predetermined range and a stabilizer such as gelatin or similar material. The enzymes are, respectively, glucose aerodehydrogenase, commonly known as glucose oxidase, which is capable of converting glucose to gluconic acid in the presence of atmospheric oxygen and at the same time of forming hydrogen peroxide and, secondly, an enzyme which is usually called peroxidase. The latter enzyme is capable of catalyzing the oxidation of oxidizable dyes when it is present together with such dye and hydrogen peroxide.

The composition may be made into a suspension or solution and used to impregnate an absorbent material such as paper, wood, fiber or the like, having any desired size or shape. Such a product, after drying, will undergo a distinct color change when contacted with moist glucose-containing material. It is particularly usefully employed when the impregnated paper is in the form of small test strips which can be used in conjunction with the testing device described in copending application Serial No. 765,078, filed October 3, 1958, to Donald T. Sapit and Frank J. Ewers, Jr., entitled "Fertility Tester," now U.S. Patent No. 3,017,879, issued January 23, 1962.

As previously stated, it has been discovered that the presence of relatively large amounts of glucose in the secretions surrounding the cervix is coincident with ovulation. There is little or no glucose present in the secretions before ovulation, but significant and measurable amounts are present before and at the time of ovulation. The previously mentioned fertility testing device has ingeniously solved the problem of bringing a strip of absorbent material to the region of the cervix without touching the walls of the vagina. When the strip is used by such a testing device and is not impregnated with a glucose responsive medium, there is no problem that the impregnant may be an irritant for the mucosa. On the other hand, when the strip has been, prior to the test, impregnated with an indicator composition, the problem of whether such a composition causes undue irriations to the mucosa must be considered. Many substances, of course.

irritate the extremely sensitive mucous membranes of the cervix. The present invention relates to a composition which is entirely safe on mucous membranes.

As a means of illustrating a preferred embodiment of the composition of the present invention, attention is directed to the following example. The example hereinafter described is illustrative of the invention and it will be apparent therefrom that various modifications may be made without departing from the spirit and scope of the invention.

EXAMPLE I

A mixture was prepared containing:

| | Mg. |
|---|---|
| Glucose oxidase (Deoxin, Nagase Co., described hereinafter) | 200 |
| Peroxidase | 5 |
| Gelatin | 50 |
| Trisodium citrate | 1320 |
| Gum guaiac | 200 |
| Citric acid | 620 |

In preparing this mixture, the gelatin was dissolved in 5 ml. of warm water. The gum guaiac was first ground and then dissolved in 5 ml. of acetone. After standing for approximately 30 minutes the solution was filtered to remove remaining undissolved material. The filtered acetone solution of the gum guaiac was then added to the solution containing the gelatin. The buffer solution was prepared by adding the citric acid and trisodium citrate to 5 ml. water. This mixture was then added to the gelatin-guaiac mixture. Then there was added 5 ml. of water containing the glucose oxidase and peroxidase.

In order to make the test strips, absorbent paper, such as filter paper, was impregnated with the resultant mixture. The impregnation may be accomplished by any conventional and suitable method, such as by dipping strips into the solution and then vacuum drying them.

When the dried impregnated strips are contacted with liquid containing small amounts of glucose, they will turn blue. The depth of the color change is proportional to the amount of glucose present in the liquid. By using guaiac as the oxidizable dye, an indicator is used which is safe in that it does not affect mucosa adversely.

The present invention contemplates the use of pure glucose oxidase, thereby avoiding the production of false positive results. Most of the glucose oxidase products commercially available contain certain amounts of starch and other impurities. Any starch present with the glucose oxidase has a tendency to react with the enzymes and/or bacteria that may be present in the region of the cervix. In the reaction, the starch breaks down to glucose. This glucose then reacts with the glucose oxidase to produce a result in the same manner as if the secretions around the cervix contained glucose. The absence of starch prevents the false reactions from taking place, thereby avoiding spurious results.

When we refer to pure glucose oxidase we are therefore referring to a glucose oxidase which is substantially free from the presence of impurities of a reducing nature such as starch, and also impurities which are normally associated with glucose oxidase and which are capable of reacting with other reducing substances present in the cervical mucus.

Glucose oxidase obtained from molds, such as *Aspergillus niger, Penicillium resticulosum, Iridophycus flaccidum, Penicillium notatum,* and the like are understood to be able to metabolize a variety of carbohydrate sources which may be available to them during their fermentation cycle. Hence it will be recognized that glucose oxidase made by the fermentation method employing one of the aforementioned organisms, probably has certain impurities present in it. Logically these impurities are oxidases of monosaccharides other than glucose, such as oxidases of galactose, mannose, and fructose. If these other monosaccharide oxidases come into contact with their corresponding monosaccharides known to be present in cervical mucus, they will give a color indicator test which cannot be distinguished from a positive test for glucose. This gives rise to the "sporadic irregular positives" which have plagued the prior art.

A pure glucose oxidase, as we have referred to it in previous paragraphs, can be obtained by the fermentation of a suitable medium using the organism *Penicillium amagasakaiense*. Tests have proven that this organism excretes only glucose oxidase during its fermentation cycle and does not metabolize other monosaccharides, therefore not producing oxidases of monosaccharides other than glucose oxidase (see the article entitled "Crystalline Glucose Oxidase" by Kiyoshi Kusai in the Annual Reports of the Scientific Works of the Faculty of Science, Osaka University, vol. VIII, pp. 43–74, 1960).

On page 65 of said artcle in Table VIII, it is recorded that the glucose oxidase prepared by fermentation using *Penicillium amagasakaiense*, oxidizes glucose but does not oxidize galactose, mannose, fructose, lactose, maltose, xylose, sucrose and other saccharides.

The glucose oxidase prepared from *Penicillium amagasakaiense* is concentrated by treatment with Amberlite CG-50 (a weakly acidic cation exchange resin) on which the active ingredient is adsorbed. Successive adsorption and elution from the resin, coupled with crystallization from ammonium sulfate solution, and ammonium sulfate fractionation, results in the preparation of a pure crystalline glucose oxidase having an activity of 30,000 units per gram or higher.

EXAMPLE II

In order to develop a better understanding of the problem of false positive reactions which may be obtained with impure glucose oxidase, the following experiment was devised and run. Five solutions were prepared following the formulation cited under Example I, and these solutions were identical except for the inclusion of different glucose oxidases as follows:

*Solution A.*—A technical grade glucose oxidase produced by the solvent precipitation process from a fermentation reaction employing *Aspergillus niger* or *Penicillium notatum*. The potency of the technical grade glucose oxidase is approximately 13,000 units per gram. The concentration is adjusted so that 25 ml. of the final test solution contained a total of 6,000 units of glucose oxidase activity.

*Solution B.*—A refined grade of glucose oxidase produced by the solvent precipitation process from a fermentation employing *Aspergillus niger* or *Penicillium notatum*. The potency of said glucose oxidase is about 30,000 units per gram. The concentration is adjusted so that 25 ml. of the final test solution contained 6,000 units of glucose oxidase activity.

*Solution C.*—A refined liquid glucose oxidase product produced by the solvent precipitation method. The potency of the glucose oxidase is about 1,200 units per ml. and the concentration is adjusted so that 25 ml. of the final test solution contains 6,000 units of glucose oxidase activity.

*Solution D.*—A technical grade of glucose oxidase produced from a fermentation reaction employing *Aspergillus niger* or *Penicillium notatum*. The potency of the glucose oxidase is approximately 1,500 units per gram. Because of low solubility of this sample, the concentration is adjusted so that 25 ml. of the final test solution contained 3,000 units of glucose oxidase activity.

*Solution E.*—A pure glucose oxidase produced by a fermentation process employing *Penicillium amagasakaiense* and recovered by an ion exchange resin process with solvent precipitation and ammonium sulphate fractionation and crystallization. The potency of this pure glucose oxidase is 30,000 units per gram. The concentration of the solution is adjusted so that 25 ml. of the final test solution contains 6,000 units of glucose oxidase activity.

A comparative test was conducted in the following manner. Into each of five separate spot plates there was introduced 0.8 ml. of solution A. To the first of said plates were added a solution containing 100 micrograms of pure d-mannose; to the second, 100 micrograms of pure d-fructose; to the third, 100 micrograms of pure galactose; to the fourth, 100 micrograms of pure glucosamine; and to the fifth, 100 micrograms of pure d-glucose. After allowing sufficient time for complete reaction between the glusoce oxidase and the monosaccharide in each of the spot plates, the color response from the gum guaiac contained in the solutions in each of the spot plates was observed and recorded, employing the following grading system. The same test was employed with solutions B, C, D, and E.

++++ = dark blue color formed
+++ = medium blue color formed
++ = light blue color formed
+ = very slight trace of color formed
− = no color formed The results obtained by this test are summarized in the following table:

*Table A*

|  | Solution A | Solution B | Solution C | Solution D | Solution E |
|---|---|---|---|---|---|
| d-Mannose | ++++ | ++++ | ++++ | +++ | + |
| d-Fructose | + | − | − | − | − |
| Galactose | ++++ | ++++ | ++++ | +++ | + |
| Glucosamine | − | − | − | − | − |
| d-Glucose | +++ | +++ | +++ | ++++ | ++++ |

From the foregoing recorded results, it is clear that the glucose oxidases employed in solutions A, B, C, and D contained substantial amounts of monosaccharide oxidases capable of oxidizing d-mannose and galactose. On the contrary, however, solution E, which is the pure glucose oxidase defined in the present application, did not contain any significant amount of monosaccharide oxidases other than glucose oxidase and therefore would not oxidize d-mannose galactose or any monosaccharide other than d-glucose.

From the foregoing results it is apparent that an indicator composition which would have employed any one of solutions A, B, C, or D would have given a positive test with cervical mucus, which is known to contain galactose, mannose, fructose and glucosamine, whether or not there was any glucose actually present in the cervical mucus. Hence any of the glucose oxidases employed in solutions A, B, C, or D would be ineffective for the purpose of detecting solely the presence of glucose in cervical mucus and would be ineffective in giving a dependable evaluation of the period of greatest fertility of the female.

EXAMPLE III

To confirm the results disclosed in Example II with a test strip of absorbent paper which has been impregnated with the composition disclosed in Example I hereof, papers were prepared by the directions of Example I employing the various glucose oxidases of the solutions defined in Example II along with the other essential ingredients used in Example I. Test tape A employs the glucose oxidase of solution A. Test tape B the glucose oxidase of solution B. Test tape C the glucose oxidase of solution C, test tape D the glucose oxidase of solution D and test tape E the glucose oxidase of solution E, the preferred glucose oxidase as defined in the present invention.

A sample of each of the tapes was then contacted with one drop of a 0.1% solution of d-mannose, d-fructose, galactose and d-glucose respectively. After waiting for three minutes to allow the maximum of color to develop, the test tapes were observed and the formation of color was noted, employing the same grading system as set forth in Example II. The results of this test are summarized and recorded herein in the following table:

*Table B*

|  | Test Tape A | Test Tape B | Test Tape C | Test Tape D | Test Tape E |
|---|---|---|---|---|---|
| d-Mannose | +++ | +++ | +++ | ++ | + |
| d-Fructose | − | − | − | − | − |
| Galactose | +++ | +++ | +++ | ++ | + |
| d-Glucose | +++ | +++ | +++ | +++ | ++++ |

From the foregoing results it is apparent that tape E which is the tape employing the pure glucose oxidases defined in this invention gave practically no color change when contacted with d-mannose or galactose, indicating the absence of any monosaccharide oxidase which would be capable of oxidizing these monosaccharides. On the other hand, tapes A, B, C, and D which contain the impure glucose oxidases, gave strongly positive color reactions with d-mannose and galactose as well as d-glucose. Obviously these glucose oxidases are ineffective in distinguishing between mannose, galactose and d-glucose, and would give false positive reactions if one were trying to test only for glucose.

In a modification of the invention the indicator composition need not be applied to the absorbent paper. The paper may be used to pick up the to-be-tested fluid from the situs and then the indicator composition in solution may be applied to the paper. The absorbent paper having fibrous qualities enables distribution of the solution by excellent capillary action.

The presence of the citric acid and trisodium citrate is to buffer the testing composition in the event that the secretions tesed are abnormally acid or alkaline due to bacterial action or the like. The buffer disclosed by the present invention results in maintaining a slightly acidic condition.

While in the above Example I the amount of glucose oxidase was stated as 200 mg., this was meant to illustrate only an exemplary quantity. Lesser quantities may be employed. For instance, the quantity of glucose oxidase may be as low as 50 mg. Also, the present invention contemplates the employement of greater quantities of gelatin than 50 mg. As a matter of fact, the range may be considered to be between about 50 mg. to 200 mg. The solvent employed for the gum guaiac may be alcohol instead of the acetone recited in the above. It has been discovered that neither alcohol nor acetone inhibits the action of the glucose oxidase.

The foregoing is considered as illustrative only of the present invention. Further, since numerous modifications and changes will readily occur to those skilled in the art, it is not desired to limit the invention to the exact construction and operation shown and described and, accordingly, all suitable modifications and equivalents may be resorted to, falling within the scope of the invention as claimed.

What is claimed is:

1. In the method of detecting the fertility of the female by determination of the presence of glucose in cervical mucus which also contains other saccharides, which comprises bringing into contact with the cervical mucus an indicator composition consisting essentially of a mixture of glucose oxidase, peroxidase, and a color forming substance adapted for a color change in the presence of hydrogen peroxide, the improvent whereby sporadic false positives are eliminated which comprises utilizing a glucose oxidase which is substantially free of oxidases of monosaccharides other than glucose.

2. The method of claim 1 wherein the glucose oxidase which is substantially free of oxidases of monosaccharides other than glucose is *Penicillium amagasakaiense*.

References Cited in the file of this patent

UNITED STATES PATENTS 2,848,308     Free _____ Aug. 19, 1958

FOREIGN PATENTS 203,451     Australia _____ Sept. 27, 1956

OTHER REFERENCES

Keilin et al.: Biochemical Journal, vol. 42, 1948, pp. 230–238, 23–230 Bio.